US008000749B1

(12) United States Patent
McConnell et al.

(10) Patent No.: US 8,000,749 B1
(45) Date of Patent: Aug. 16, 2011

(54) ACCESS AND USE OF AD CONTENT LOADED ONTO WIRELESS TELEPHONES

(75) Inventors: Von K. McConnell, Leawood, KS (US); Karl W. Hammerberg, Olathe, KS (US); Bradley A. Borchert, Spring Hill, KS (US); Dale Schempp, Lenexa, KS (US)

(73) Assignee: Sprint Spectrum L.P., Overland Park, KS (US)

( * ) Notice: Subject to any disclaimer, the term of this patent is extended or adjusted under 35 U.S.C. 154(b) by 657 days.

(21) Appl. No.: 11/716,301

(22) Filed: Mar. 9, 2007

(51) Int. Cl.
*H04B 1/38* (2006.01)

(52) U.S. Cl. .............. 455/566; 455/412.1; 705/14.4

(58) Field of Classification Search .............. 455/566, 455/412.1, 414.1–414.4
See application file for complete search history.

(56) References Cited

U.S. PATENT DOCUMENTS

| 5,420,606 | A * | 5/1995 | Begum et al. ............. 345/156 |
| 5,918,014 | A | 6/1999 | Robinson .................. 709/219 |
| 6,202,023 | B1 | 3/2001 | Hancock .................. 701/201 |
| 2003/0013483 | A1 * | 1/2003 | Ausems et al. ............ 455/556 |
| 2003/0157928 | A1 | 8/2003 | Phillips .................. 455/414.1 |
| 2003/0181201 | A1 * | 9/2003 | Bomze et al. ............ 455/414.3 |
| 2005/0215238 | A1 * | 9/2005 | Macaluso ................ 455/414.1 |
| 2007/0088801 | A1 * | 4/2007 | Levkovitz et al. ............ 709/217 |
| 2007/0136761 | A1 * | 6/2007 | Basmajian et al. ............ 725/62 |
| 2007/0178889 | A1 * | 8/2007 | Cortegiano et al. ........ 455/414.3 |
| 2007/0184820 | A1 * | 8/2007 | Marshall ................ 455/414.3 |
| 2008/0288763 | A1 * | 11/2008 | Reik .......................... 713/2 |

FOREIGN PATENT DOCUMENTS

KR 20010093612 10/2001

OTHER PUBLICATIONS http://www.webtechgeek.com/How-to-Change-windows-Startup-Graphics.htm , 5 pages (Jan. 2007).
http://www.marketingterms.com "Splash Page" Definition, 3 pages (Feb. 2007).
U.S. Appl. No. 11/405,195, filed Apr. 17, 2006.
U.S. Appl. No. 11/438,540, filed May 22, 2006.

* cited by examiner

*Primary Examiner* — Jean Gelin
*Assistant Examiner* — Michael Nguyen

(57) ABSTRACT

Ad content for display on a display of a wireless telephone is loaded onto the phone, e.g., at the time of manufacture or distribution, or later after initial sale of the phone. The phone memory also includes software features by which the user of the phone can access specific ad content. The ad content includes information, e.g., a coupon or bar code, for presentation to a merchant on the display of the phone at the point of sale of a product or service promoted in the ad.

20 Claims, 4 Drawing Sheets

ACCESS AND USE OF AD CONTENT LOADED ONTO WIRELESS TELEPHONES

BACKGROUND

A. Field

This invention relates generally to the field of storage and presentation of advertising content on wireless telephones. The term "wireless telephone" is intended to encompass conventional cellular telephones, as well as other portable devices with telephone functionality such as personal digital assistants, handheld computers, and similar devices.

B. Related Art

Prior art related to the general subject of presenting advertising content on wireless telephones includes Phillips, US Patent Application Publication 2003/0157928 A1, and published Korean patent application publication KR 2001009362, published Oct. 29, 2001. Other prior art of interest includes Hancock, et al., U.S. Pat. No. 6,202,023, Robinson, U.S. Pat. No. 5,918,014 and Begum et al., U.S. Pat. No. 5,420,606.

Two pending patent applications of the assignee of the present invention are also related to this disclosure: James D. Barnes et al., "DYNAMIC ADVERTISING CONTENT DISTRIBUTION AND PLACEMENT SYSTEMS AND METHODS," U.S. Ser. No. 11/405,195 filed Apr. 17, 2006 and James D. Barnes, et al., "SYSTEMS AND METHODS FOR STATE BASED ADVERTISEMENT MESSAGING ACROSS MEDIA TYPES," U.S. Ser. No. 11/438,540 filed May 22, 2006. The entire content of these two pending applications is incorporated by reference herein. Prior art status of these applications is not admitted in view of 35 U.S.C. §103 (c)(1).

SUMMARY

The present invention provides for new ways of storing and accessing advertising content in a wireless telephone and also ways of accessing and using advertising content stored on the wireless telephone at a point of sale.

In a first aspect, an improvement is provided to a wireless telephone having a user interface. The improvement involves storing in a memory in the telephone a plurality of advertising content or ads. The ads may take several forms, such as for example "splash ads." The term "splash ad" refers to an advertisement which is briefly presented on the display of the telephone and the ad then fades out or is replaced with another screen display. The ad can be replaced by a new screen, such as a home screen of an application such as an email application or web browsing application, the home or main screen of the wireless telephone, or by another ad. The splash ads can be displayed upon turning on the phone, loading an application, upon turning off the phone, or at other times.

The improvement further includes providing a set of instructions in the memory for (1) displaying the advertising content to a user of the telephone and (2) allowing a user to access a specific item of advertising content (i.e., a specific ad) using the user interface. For example, the user can search through a menu or list of ad content stored in the memory and select one particular ad for display.

The selected item of ad content that is displayed further includes information or data which is designed for presentation to a merchant in association with a purchase of a product or service associated with the item of ad content. For example, the selected ad content may include a bar code, UPC code, coupon, an expiration date for the promotion, conditions for the promotion, or other information. The user presents the phone displaying the ad along with the code/coupon or other information to the merchant at the point of sale. For example, the ad may contain a display of a coupon which states, that the advertised product is to be sold at a discount, a UPC code for the product, and an expiration date. When the user of the phone presents the product to the checkout counter, the ad is displayed on the phone display for the clerk. The clerk scans in the UPC code and checks the expiration date. The user then receives the discount when they purchase the product.

In one embodiment, the advertising content is loaded into the memory of the telephone prior to an initial distribution of the telephone to an end user of the telephone. For example, at the time of manufacture, the memory chip which is installed in the phone includes pre-loaded advertising content. The wireless telephone manufacturer makes arrangements with merchants, manufacturers, service providers, or other types of advertisers to load their own specific advertising onto new phones being manufactured. The phones are subsequently placed into the stream of commerce. When the user purchases the phone and turns it on, the ad content is displayed and used as described herein. In another variation, the memory could be loaded with the advertising content by a distributor of the phone or by a retail merchant at the time of sale of the phone to the end user/purchaser.

In one variation, the advertising is presented on a rotating basis. For example, the phone includes an advertisement manager application which selects advertisement to display on the phone at the time of turning the phone on a rotating basis so that all the advertisements get equal exposure time. In another variation, statistics on the number of times the advertisement is displayed is collected on the telephone. Such statistics can be periodically updated to a network server in the wireless service provider network. Thus, metrics on the number of times of display of the ads, and the number of phones on which the ads are displayed, are provided to the manufacturers or merchants and thus provide a way that the advertisers can track this form of marketing.

In another aspect, a method is disclosed for outfitting a wireless telephone having a memory and user interface for subsequent distribution to an end user. The method includes the steps of a) storing in the memory a plurality of advertising content; and b) providing a set of instructions in the memory for (1) displaying the advertising content to a user of the telephone and (2) allowing a user to access a specific item of content in the advertising content using the user interface. The specific item of content further includes information for presentation to a merchant in association with a purchase of a product or service associated with the item of content, such as for example a bar code, a UPC code, a coupon, or other information of interest to the merchant.

In addition to the exemplary aspects and embodiments described above, further aspects and embodiments will become apparent by reference to the drawings and by study of the following detailed descriptions.

DETAILED DESCRIPTION OF PREFERRED EMBODIMENTS

Figure 1:
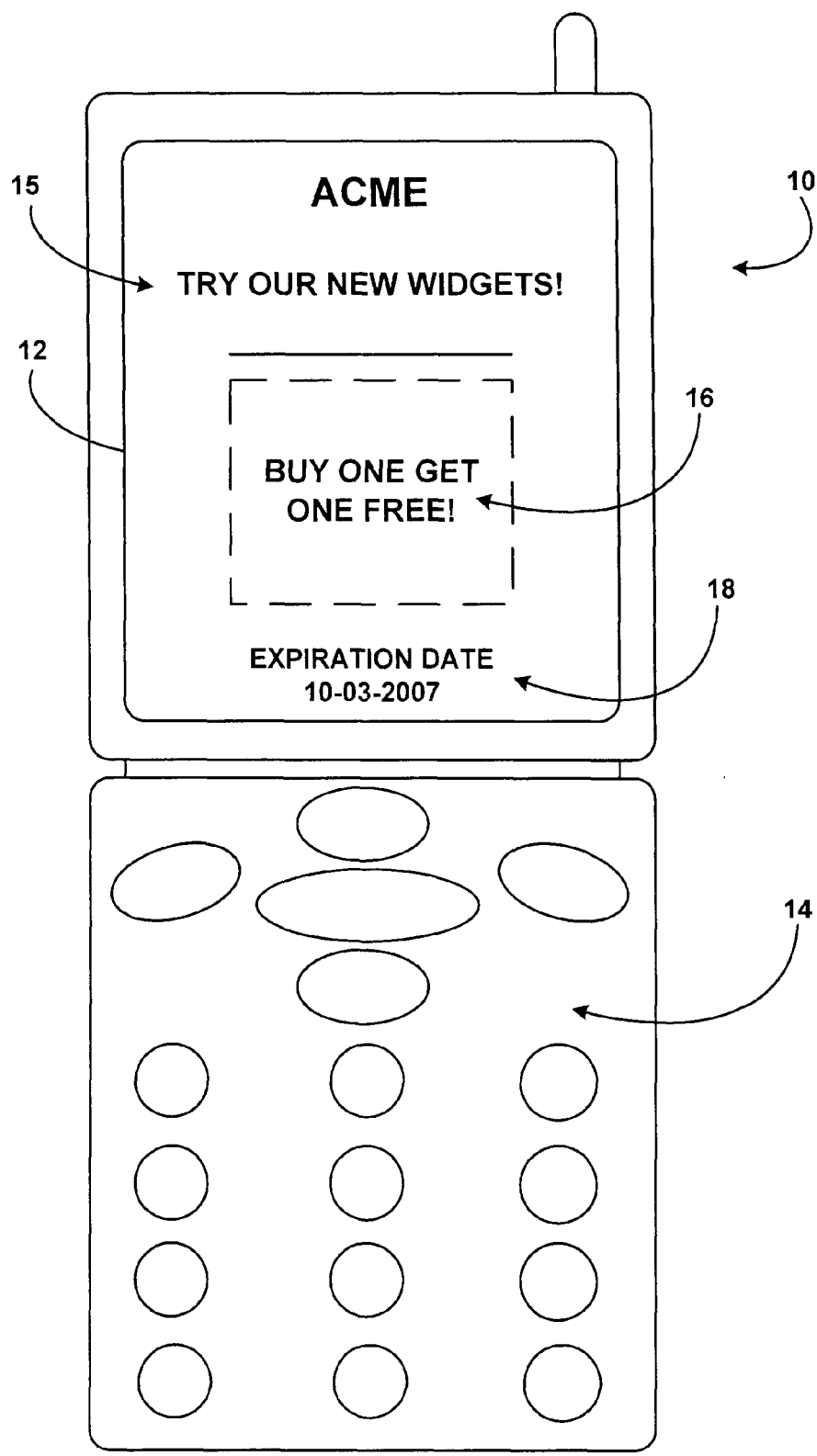
FIG. 1 is an illustration of a wireless telephone showing a display of an advertisement stored in a memory in the phone.

Improvements to wireless telephones are contemplated in which the phone is augmented with features which provide for storage, access and use of advertising content via a user interface of the phone. Referring now to FIG. 1, there is shown a wireless telephone 10 which includes a user interface including a screen display 12 and a plurality of buttons, keys and like devices 14 for inputting commands and information into the phone. The phone 10 includes a memory storing program instructions (not shown in FIG. 1) which are conventional and provide for functionality such as the ability to receive and make calls, browse the Web, check email, listen to music, send and receive text messages, and other functions as are known in the art. The phone 10 further includes a set of instructions in the memory for controlling access and display of the advertising content. The instructions perform at least two functions: (1) displaying the advertising content to a user of the telephone (e.g., upon turning on the phone, upon launch of a new application, while the phone is ringing, etc.) and (2) allowing a user to access a specific item of content in the advertising content (i.e., a specific ad) using the user interface 14.

The memory of the phone 10 of FIG. 1 stores one or more advertising content or ads. The ads may take several forms, such as for example "splash ads." The splash ads can be displayed upon turning on the phone, loading an application, upon turning off the phone, during ringing, or at other times. For example, when the phone is turned on, an ad 15 as shown in FIG. 1 is displayed on the display 12 for a brief period of time (e.g., 5 seconds) while the phone operating system boots up. The ad can take any form, the example shown in FIG. 1 is offered by way as example only and not by way of limitation. The ad can include graphics as well as sound produced on the speakers of the phone. The ad may include a promotional message ("try our new widgets"), and a coupon 16 ("buy one get one free"). The ad may also include an expiration date 18 (10-3-2007).

Figure 2:
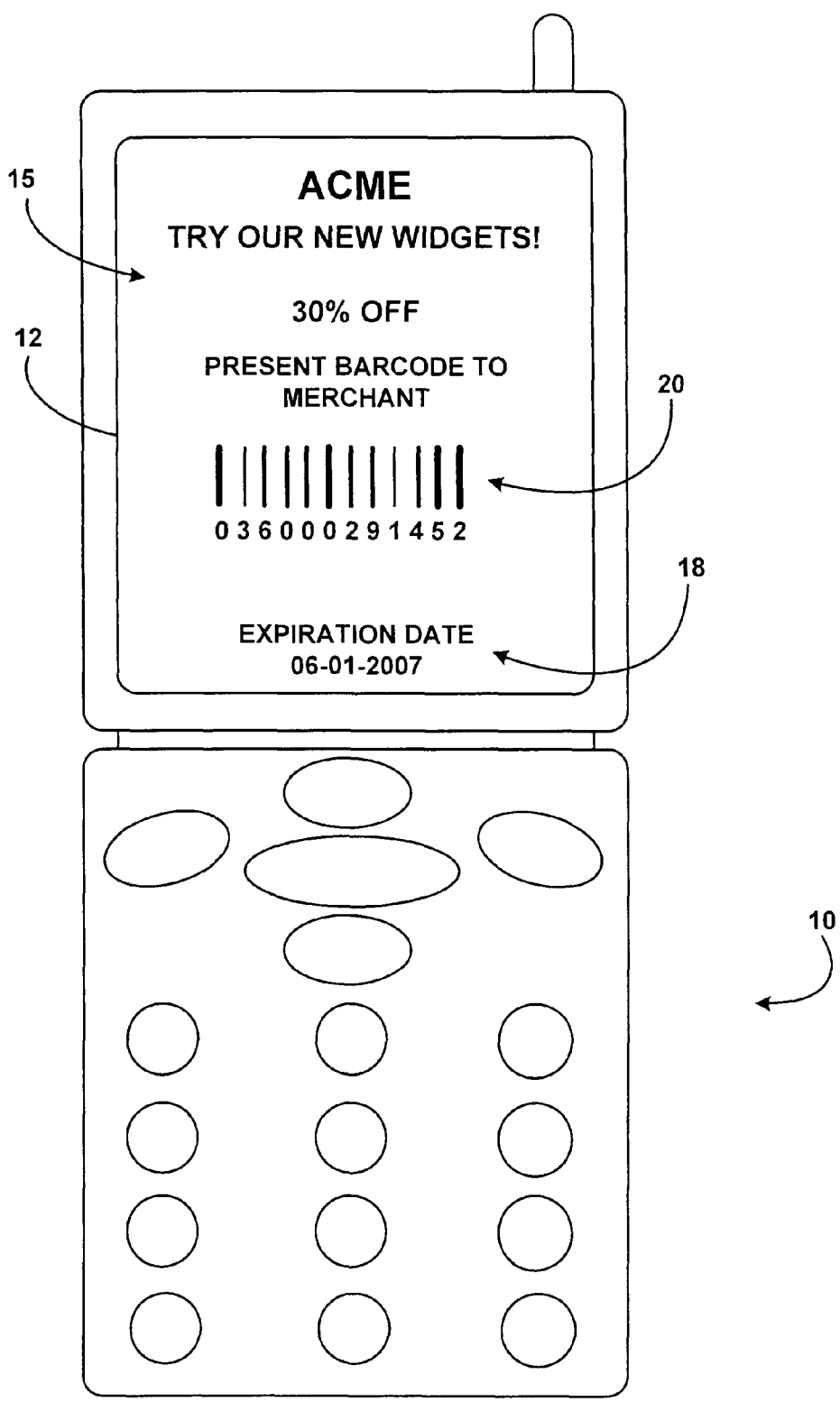
FIG. 2 is an illustration of a second example of a display of an advertisement stored in the memory in the phone.

FIG. 2 shows a second example of an ad which is displayed on the display 12 of the phone 10. The ad 15 includes a promotional message ("try our new widgets, 30% off"), a bar code 20, an instruction to present the bar code to a merchant, and an expiration date 18. The bar code is provided so that the merchant at a point of sale can scan the code and receive information on the product to which the promotion applies. For example, the bar code could be a UPC code for a particular product that is the subject of the promotion. The bar code could be a non-UPC code which contains other information, such as terms and conditions of the promotion, a class or group of products to which the promotion applies, the amount of the discount, or virtually any other information which would be of use to a merchant. The bar code could be a one-dimensional bar code, a two-dimensional bar code, or any other type of format for information.

In a typical embodiment, the memory of the phone will store a multitude of ads, such as 10, 20 or even more, and display them on the phone on a rotating basis. That is, each time the phone 10 is turned on (or when an application such as a web browser is launched), a different ad is displayed. In one embodiment, all ads are treated equally and given equal playing time. In a variation, some ads are played more often than others. For example, the phone manufacturer installs the ads onto the memory at the time of manufacture and controls the frequency or preference of playing particular ads in accordance with deals or contracts with the manufacturers and merchants that supply the ads.

The control and timing of the rendering of the ads on the phone display 12 is controlled by software instructions stored in the memory of the phone. The structure or design of the software is not particularly important and can vary widely. In one possible embodiment, the software can take the form of an advertisement management system (AMS), i.e., a piece of software loaded in memory that controls the rendering of the ads, as described in the above-referenced application Ser. No. 11/438,540 and described in some detail below in conjunction with FIG. 4.

Figure 3:
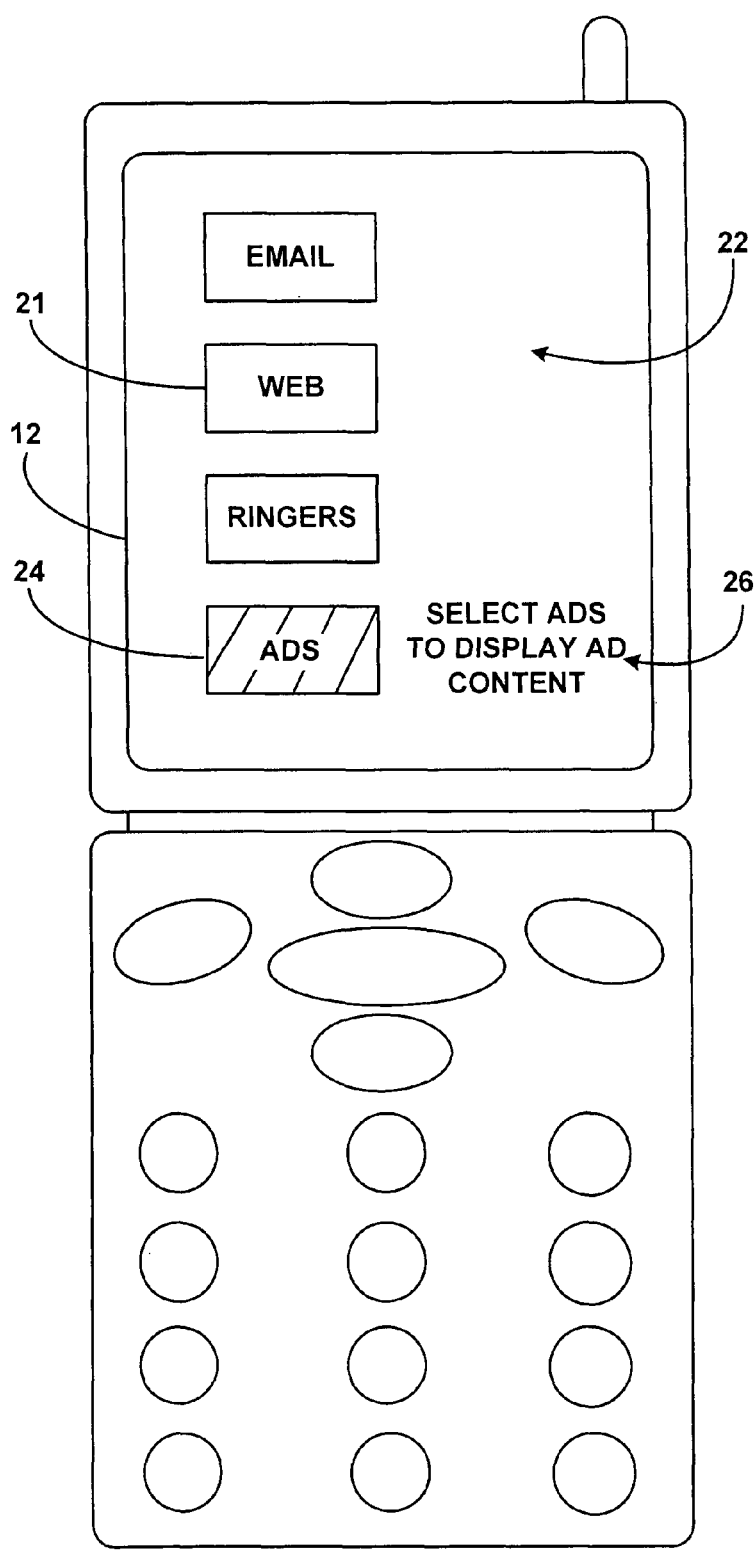
FIG. 3 is an illustration of a display of a page presented on the phone of FIG. 1 with an icon for advertising content. The user selects the "ADS" icon and a list of the content stored in the memory is presented in a new screen (not shown). The user selects a particular ad content from the list when they wish to present a coupon/bar code, or other content in the ad to a merchant at the point of sale.

As shown in FIG. 3, the phone may include a home page 22 which displays icons associated with functions or applications loaded on the phone, such as WEB icon 21. The icons include an ADS icon 24 which, when activated, allows the user to search for and render on the display of the phone a particular ad. For example, when the user highlights the ADS icon 24, a message 26 is displayed which states that the user should select the ADS icon to display ad content. When the ADS icon 24 is selected, a list of the ads (or titles for the ads) loaded on the phone is presented on the display 12. The user toggles or otherwise scrolls through the list of ads and selects the one they want to display. For example, the user can toggle through a menu or list of ad content and select either the ad of FIG. 1 or FIG. 2, or any other ad stored in memory. A user would do this when they wish to purchase the product or service mentioned in the ad and are at a point of sale, so that they can present the coupon, bar code or other element in the ad to the clerk and take advantage of the promotion mentioned in the ad.

To generalize this concept, with reference to FIG. 1 and FIG. 2, the selected item of ad content that is displayed on the display 12 further includes information or data which is designed for presentation to a merchant in association with a purchase of a product or service associated with the item of content. For example, the selected ad content may include a bar code, UPC code, coupon, an expiration date for the promotion, conditions for the promotion, or other information. The user presents the phone showing the ad along with the code/coupon or other information to the merchant at the time of purchase. For example, the ad may contain a display of a coupon (FIG. 1) which states that the advertised product is to be sold at a discount, and an expiration date. As another example, the ad may contain a bar code 20 (FIG. 2). When the user of the phone presents the product mentioned in the ad to the clerk at the checkout counter, the ad is displayed on the phone display for the clerk to see. The clerk then scans in the UPC code presented on the phone display and checks the expiration date. The user then receives the discount when they purchase the product.

The use of bar codes in the ad content, which are scanned in and checked by a clerk at the point of sale, is considered preferred in that it helps prevent unscrupulous persons from creating fraudulent promotions on their phones and trying to pass off such fraudulent promotions onto unsuspecting merchants. Presumably, if the promotion has no bar code and cannot be checked by a computer, the merchant may not know whether the promotion is legitimate or not. Also, the use of bar codes which are scanned at the point of sale helps the merchant track the number of instances that the promotions are used and obtain reimbursement from the advertiser. The merchant can take other steps to insure, reimbursement from the advertiser occurs, such as having the customer presenting the ad on their phone sign a receipt or slip which is then retained by the merchant.

In one specific embodiment, the advertising content takes the form of splash ads, and the splash ads are presented to the user upon loading of an application resident in the memory of the wireless telephone. For example, with reference to FIG. 3, if the user clicks on the WEB icon 21, as the web browser is loading an ad such as shown in FIG. 1 or FIG. 2 is presented on the display 12. The ad is a splash ad and fades or is removed from the screen say in 5 or 10 seconds, at which point the web browser is displayed with no ads. In one further variation, two or more ads could be displayed in this period of time. Both could be splash-type ads, one after the other, or two or more ads could be displayed at the same time on the display.

In one embodiment, the advertising content is loaded into the memory of the telephone prior to an initial distribution of the telephone to an end user of the telephone. For example, at the time of manufacture, the memory chip which is installed in the phone includes pre-loaded advertising content. The wireless telephone manufacturer makes arrangements with merchants, manufacturers, service providers, or other types of advertisers to load their own specific advertising onto new phones being manufactured. The phones are subsequently placed into the stream of commerce. When the user purchases the phone and turns it on, the ad content is displayed and used as described herein. In another variation, the memory could be loaded with the advertising content by a distributor of the phone or by a retail merchant at the time of sale of the phone to the end user/purchaser. In still another variation, the advertising content could be transmitted to the wireless telephone 10 over the air interface from a network node, e.g., on a periodic basis, thereby keeping the ad content "fresh."

In one possible embodiment, statistics on the number of times the advertisement is displayed or used is collected on the telephone. Such statistics can be periodically updated to a network server in the wireless service provider network. Thus, metrics on the number of times of display of the ads, and the number of phones on which the ads are displayed, and the number of times the ads are presented to merchants are provided to the manufacturers or merchants and provide a way of tracking their marketing.

In another aspect, a method is disclosed for outfitting a wireless telephone having a memory and user interface for subsequent distribution to an end user. The method includes the steps of a) storing in the memory a plurality of advertising content (e.g., as shown in FIGS. 1 and 2); and b) providing a set of instructions in the memory for (1) displaying the advertising content to a user of the telephone and (2) allowing a user to access a specific item of content in the advertising content using the user interface, as explained above in conjunction with FIG. 3. The specific item of content further includes information for presentation to a merchant in association with a purchase of a product or service associated with the item of content, such as for example a bar code, a UPC code, a coupon, or other information of interest to the merchant.

Figure 4:
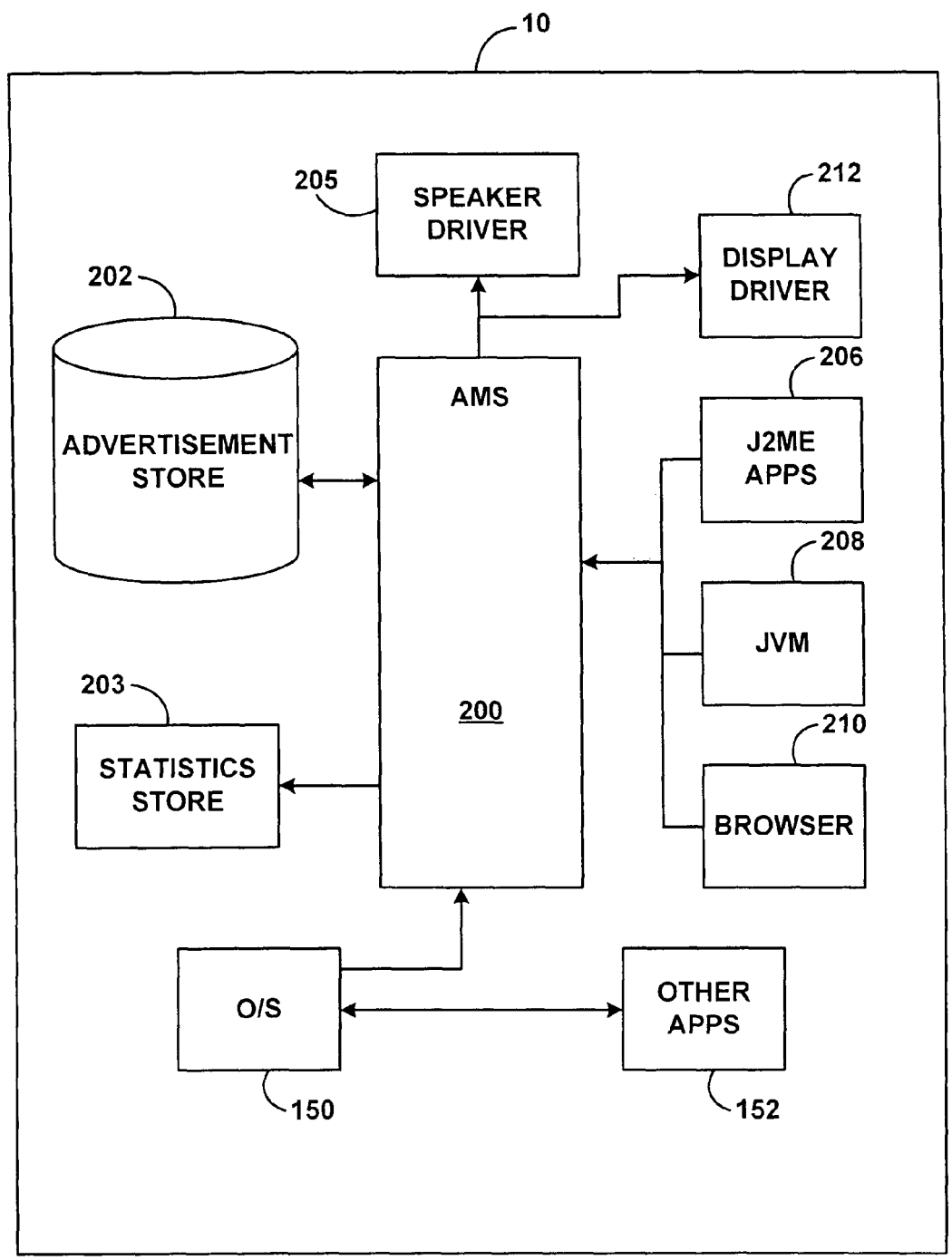
FIG. 4 is a block diagram of software modules present in the phone of FIG. 1 for carrying out the methods described herein.

FIG. 4 is a block diagram of software modules and data which may be present in the memory of the telephone 10. The memory includes an Advertisement Management System 200, a software module which controls the rendering and display of ad content. The memory further includes an advertisement store 202 which stores advertisement content, which may take the form of executable files (e.g., in Java), HTML code, text, images, sound files or any other form. The memory further includes a statistics store 203 which maintains a log or other statistics of the instances in which the ad content stored in the store 202 is accessed by the user or displayed on the display. The memory further includes Java J2ME applications 206, a Java Virtual Machine (JVM) module 208, a browser 210, other applications 152, an operating system 150, a user interface display driver 212 and a speaker driver 205.

The advertisements store 202 stores a set of advertisements locally in the wireless telephone. The Advertisement Management System 200 manages display of the advertisements stored locally in the store 202. The Advertisement Management System 200 and store 202 are disclosed in further detail in related U.S. patent application Ser. No. 11/405,195 cited above, the contents of which are incorporated by reference herein.

For each advertisement to be displayed in an application or browser of the mobile device 104, the following may be stored in advertisement store 202: a name of the advertisement, the content of the advertisement (which in various embodiments comprises a banner style of ad), an expiration date and time, and a number of impressions (i.e., number of times that the particular advertisement will be displayed before deletion).

The phone 10 periodically connects to a network node in the wireless network (not shown) that is associated with the telephone manufacturer, or alternatively the wireless service provider. The connection is for the purpose of uploading advertisement display statistics from the statistics store 203. Such statistics may be furnished by the manufacturer or wireless service provider to the advertisers so that they can track the impressions and usage of their advertisements. At the time of uploading of statistics, new ad content can be downloaded to the phone as well.

Numerous exemplary aspects and embodiments have been discussed above with particularity. However, variation from the specifics of the disclosed embodiments is contemplated without departure from the scope of the invention. For example, the type or formatting of the advertisement is not particularly important and can vary widely. As noted previously, the organization or structure of the software which controls display of the ad content or manual access to particular instances of content is not particularly important either and can vary widely. It is therefore intended that the following appended claims and claims hereafter introduced are interpreted to include all such modifications and permutations.

We claim:

1. In a wireless telephone having a user interface, the improvement comprising:

storing in a memory in the wireless telephone a plurality of advertisements; and providing a set of instructions in the memory for (1) displaying a first advertisement to a user of the wireless telephone upon powering on the wireless telephone while an operating system of the wireless telephone boots up, (2) allowing the user to access a specific item of content in the first advertisement using the user interface, wherein the user interface includes icons associated with applications executable by the wireless telephone, wherein one of the icons is an advertisement icon which, when activated, allows the user to access the plurality of advertisements, and (3) causing the plurality of advertisements to be displayed in a rotation in which placement of each advertisement in the rotation is based on a priority of a supplier of each advertisement, wherein the specific item of content further comprises information for presentation to a merchant in association with a purchase of a product or service associated with the specific item of content, and wherein at least a portion of the plurality of advertisements and the set of instructions are stored in the memory of the wireless telephone prior to activation of the wireless telephone.

2. The improvement of claim 1, wherein the information comprises a UPC code.

3. The improvement of claim 1, wherein the information comprises a bar code.

4. The improvement of claim 1, wherein the information comprises a coupon.

5. The improvement of claim 1, wherein the plurality of advertisements comprises splash ads.

6. The improvement of claim 1, wherein the plurality of advertisements comprises splash ads, and wherein the splash ads are presented to the user upon loading of an application resident in the memory of the wireless telephone.

7. The improvement of claim 1, wherein the memory further includes a store of statistics on presentation of the plurality of advertisements on the wireless telephone.

8. A method of outfitting a wireless telephone having a memory and a user interface for subsequent distribution to a user, comprising the steps of:
   a) storing in a memory a plurality of advertisements; and
   b) providing a set of instructions in the memory for (1) displaying a first advertisement to the user of the wireless telephone upon powering on the wireless telephone while an operating system of the wireless telephone boots up, (2) allowing the user to access a specific item of content in the first advertisement using the user interface, wherein the user interface includes icons associated with applications executable by the wireless telephone, wherein one of the icons is an advertisement icon which, when activated, allows the user to access the plurality of advertisements, and (3) causing the plurality of advertisements to be displayed in a rotation in which placement of each advertisement in the rotation is based on a priority of a supplier of each advertisement;
   wherein the specific item of content further comprises information for presentation to a merchant in association with a purchase of a product or service associated with the specific item of content and wherein at least a portion of the plurality of advertisements and the set of instructions are stored in the memory of the wireless telephone prior to activation of the wireless telephone.

9. The method of claim 8, wherein steps a) and b) are performed by a manufacturer of the wireless telephone.

10. The method of claim 8, wherein steps a) and b) are performed by a distributor of the wireless telephone.

11. The method of claim 8, wherein the information comprises a UPC code.

12. The method of claim 8, wherein the information comprises a bar code.

13. The method of claim 8, wherein the information comprises a coupon.

14. The method of claim 8, wherein the plurality of advertisements comprises splash ads.

15. The method of claim 8, wherein the plurality of advertisements comprises splash ads, and wherein the instructions loaded in the memory cause the splash ads to be presented to the user upon loading of an application resident in the memory.

16. The method of claim 8, wherein the method further comprises the step of providing instructions on the phone for storing statistics on presentation of the plurality of advertisements on the wireless telephone.

17. The method of claim 8, wherein the set of instructions further comprise instructions for periodically obtaining downloads of new advertisements over an air interface.

18. The improvement of claim 1, wherein the icons are displayed on a home page of the user interface.

19. The improvement of claim 1, wherein the portion of the plurality of advertisements and the set of instructions are stored in the memory of the wireless telephone at a time of manufacture of the wireless telephone.

20. The improvement of claim 1, wherein the portion of the plurality of advertisements and the set of instructions are stored in the memory of the wireless telephone at a time of sale of the wireless telephone.

\* \* \* \* \*